UNITED STATES PATENT OFFICE.

FRANK A. HAGER, OF PORTLAND, OREGON.

FILLER FOR AUTOMOBILE-TIRES.

1,174,856.

No Drawing.

Specification of Letters Patent.   Patented Mar. 7, 1916.

Application filed December 5, 1914.   Serial No. 875,724.

*To all whom it may concern:*

Be it known that I, FRANK A. HAGER, a citizen of the United States, residing at Portland, in the county of Multnomah and State of Oregon, have invented a new and useful Composition of Matter to be Used as a Filler for Automobile-Tires.

My composition consists of the following ingredients combined in the following proportions, to-wit:

| | |
|---|---|
| Corn oil | 24 pounds |
| Chlorid of sulfur | 6 pounds |
| Oxid of magnesia | 17½ ounces |
| Venetian red | 3 ounces |

These ingredients are to be thoroughly mixed for a period of five minutes by stirring and the mixture is then poured into molds and allowed to stand until it hardens. The composition which is thus formed is then installed in tire casings to take the place of inner tubes and air.

What I claim and desire to secure by Letters Patent of the United States is—

A tire filler comprising the following ingredients in the proportions set forth: corn oil, twenty-four pounds; chlorid of sulfur, six pounds; magnesia, seventeen and one-half ounces; and Venetian red three ounces.

In testimony whereof I have hereunto signed my name in the presence of two subscribing witnesses.

FRANK A. HAGER.

Witnesses:
 JOHN R. TURNER,
 R. F. PETERS.

Copies of this patent may be obtained for five cents each, by addressing the "Commissioner of Patents, Washington, D. C."